April 11, 1939. A. KAMPFER 2,154,333
PROCESS FOR EXTRUDING PLASTIC MASSES ONTO SHEETS
Original Filed April 23, 1936 2 Sheets-Sheet 1

Inventor:
Adolf Kampfer,
By Watson E Coleman

April 11, 1939.  A. KAMPFER  2,154,333
PROCESS FOR EXTRUDING PLASTIC MASSES ONTO SHEETS
Original Filed April 23, 1936   2 Sheets-Sheet 2
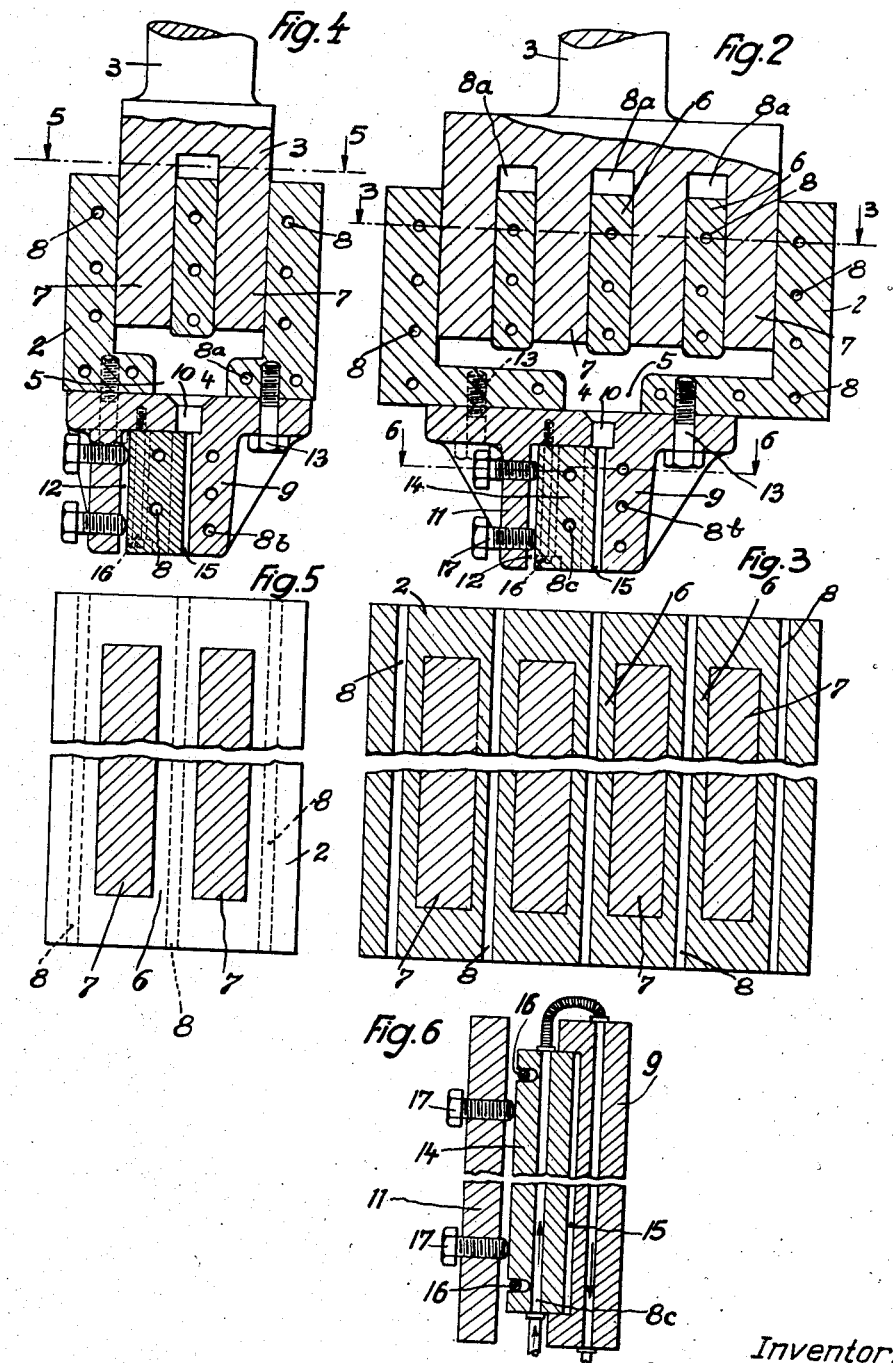
Inventor:
Adolf Kampfer,
By Watson E. Coleman Patented Apr. 11, 1939

2,154,333

UNITED STATES PATENT OFFICE 2,154,333

PROCESS FOR EXTRUDING PLASTIC MASSES ONTO SHEETS

Adolf Kampfer, Charlottenburg, Berlin, Germany

Original application April 23, 1936, Serial No. 76,046. Divided and this application September 14, 1937, Serial No. 163,866. In Germany January 31, 1936

6 Claims. (Cl. 18—57)

This invention relates to the art of coating glass or other transparent plates or sheets with plastic layers or films intended particularly for use in forming laminated glass such as is used for the windows and wind-shields of automobiles.

More particularly this invention, which is a division of my application for patent, Ser. No. 76,046, filed April 23, 1936, relates to a method of coating transparent sheets or plates with either thin films or relatively thick layers of highly and permanently elastic polymerisation products of the character particularly disclosed and claimed in my application for patent, Ser. No. 76,044, filed April 23, 1936.

The material produced by the method disclosed in my application, Ser. No. 76,044 is a high molecular weight polymerisation product of unsaturated organic initial compounds which are not plastic at ordinary temperatures and which, even when subjected to a maximum stress of tension, expansion or pressure, immediately after the release of said strain or stress, again assume their original form or shape. Such products are obtained preferably by carrying the polymerisation to or nearly to the final stage in the presence of certain organic admixtures. The product so formed is not solid in the technical sense of the word but is in the form of a gell or is thixotropic or is, in other words, flowable under mechanical stress. Because of the elasticity of this polymerisation product, it is not capable of being granulated, splintered or pulverized.

This material, however, while normally not plastic, may be rendered plastic by the application of pressure and the simultaneous application of heat within certain definite limits. Within these limits of heat, the polymerised material may be extruded under pressure through relatively narrow slots onto glass supports or plates and either in the form of thin films or relatively thick layers, such relatively thick layers being particularly adapted, because of the elasticity of the material, that is, its elastic resistance to compression and its return to its former condition upon relief of compression, to the formation of laminated glass.

I am aware that it has been proposed to produce thin sheets or foils by ejecting solutions of cellulose derivatives through a slot and depositing a sheet or foil on a sheet of glass carried past the outlet of the extruder or winding such sheet or foil on a roller. The highly elastic polymerisation product disclosed in my application, Ser. No. 76,044 previously referred to requires special methods of extruding it and applying it to the glass or other supports in order to prevent expansion of the layer after it is deposited on the glass and also to insure that the sheet, foil or layer shall be deposited on the glass or other support while still in the same highly heated and plastic condition in which it emerges from the press or extruder.

In order to understand the process, it is best to first disclose an apparatus whereby the process may be carried out, this apparatus forming the subject-matter of my application for patent, Ser. No. 76,046, filed April 23, 1936, of which the instant application is a division.

In the accompanying drawings:

Fig. 2 is a vertical section through the press box of the machine and through the plunger as illustrated in Fig. 1.

Fig. 3 is a section on the line 3—3 of Fig. 2.

Fig. 4 is a vertical section through a modified form of press box and plunger.

Fig. 5 is a section on the line 5—5 of Fig. 4.

Fig. 6 is a section on the line 6—6 of Fig. 2.

Figure 1:
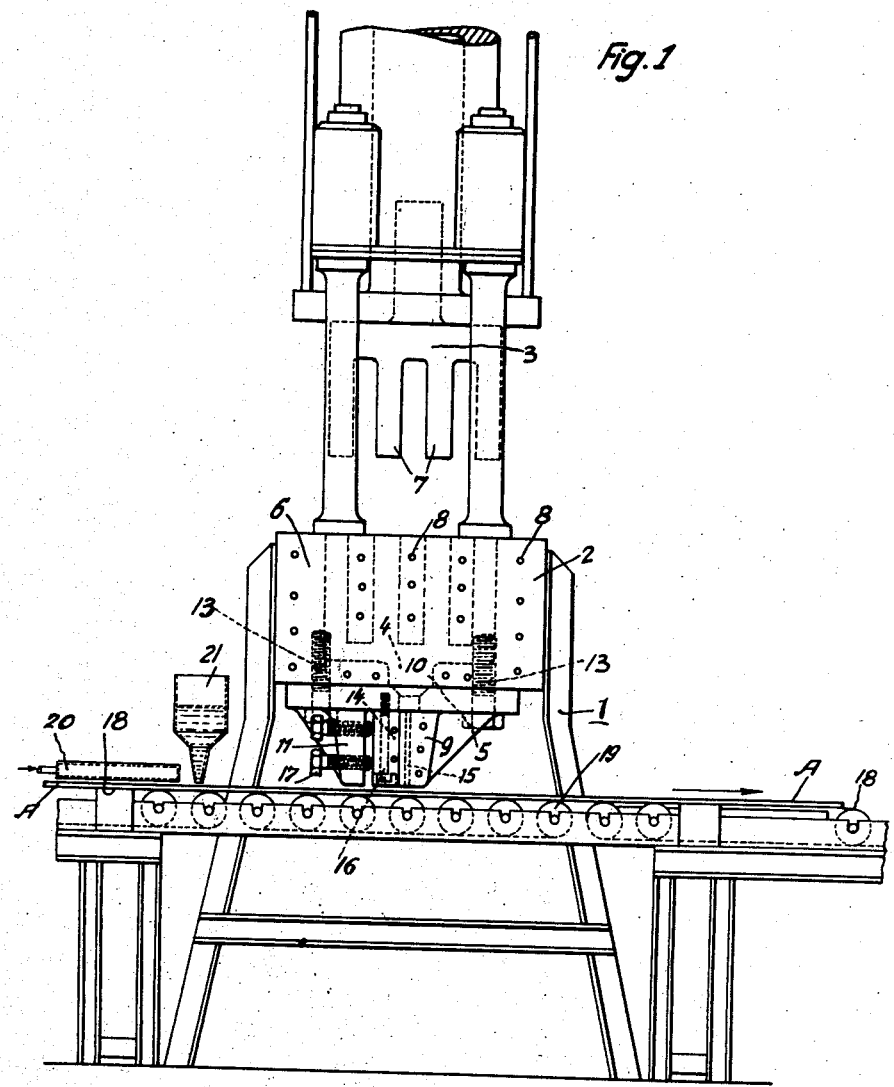
Fig. 1 is a side elevation of the apparatus used by me for the purpose of extruding my polymerisation product onto glass sheets.

By referring to the drawings and particularly to Fig. 1, it will be seen that the apparatus includes a supporting frame 1 which supports a pressure chamber or press box 2. Operating in this pressure chamber is a plunger designated generally 3. The highly polymerised mass, which as before stated, is not in a liquid or semi-liquid condition but is in a thixotropic form or gel, is placed within the chamber 4 defined by the walls 2. The interior space 4 of the chamber 2 is uniformly divided by one or more transverse walls 6. Three of such walls are shown in Fig. 2 and only one wall 6 in Fig. 4. These transversely extending walls 6 extend down from the upper edge of the chamber 2 but terminate short of the bottom of the chamber, as clearly shown in Figs. 2 and 4. The bottom of the chamber is formed with a relatively wide opening 5 extending transversely across the chamber. The plunger 3 has a head at its lower end which is formed to provide a plurality of transversely extending extensions or walls 7 which fit within the spaces defined by the end walls of the chamber 2 and the transverse walls 6.

The purpose of providing the transverse walls 6 is to provide means whereby the polymerised material within the space 4 may be continuously heated to a definite amount. To this end, these transverse walls 6 are formed with a plurality of passages 8 so that steam or other highly heated fluid may be caused to circulate through these passages. The ends walls (but not the side walls) of the chamber 2 or press box are also formed with transverse passages 8 and the bottom of the chamber 2 has any desired number of transverse passages 8ᵃ. Thus the material within the space 4 below the plunger may be kept in highly heated condition. While I have shown passages whereby steam or other heating fluid may be caused to circulate through the passages 8 and 8ᵃ, it is to be understood that other means, as for instance, electrical means, might be used for heating the end walls, transverse walls and bottom wall of the chamber 2. The side walls of the chamber 2 are not intended to be heated though they may be heated to a limited extent so that no temperature fall may occur.

Attached to the bottom of the chamber 2 in any suitable manner is one section 9 of an extruder mouth. The upper inner face of this section 9 is cut away to form one-half of a transversely extending slot-like mouth 10 which opens into the opening 5. The section 9, as shown in Fig. 6, is somewhat U-shaped in cross-section. Opposed to the section or jaw 9 and attached to the bottom of the chamber 2 on the opposite side of the opening 5 is a depending supporting member 11 which is also formed at its upper end to provide the other half of the opening 10. That face of the member 11 which confronts the jaw or section 9 is cut away at 12. These sections 9 and 11 are held in place by screws 13 or other suitable means can be used. Disposed within the recess 12 is a jaw 14 having passages 8ᶜ for heating fluid, which is adjustably mounted for sliding movement within the U-shaped jaw 9 and toward or from the U-shaped jaw to define an extruding slot 15. The upper end opens into the slot 10 defined by the member 11 and the jaw 9. The jaw 14 is held in place against dropping down out of the member 11 by means of vertical screws 16, the jaw 14 being vertically slotted to receive these screws. Screws 17 extend through the depending portion of the support 11 and bear against the outer face of the jaw 14. By releasing the pressure of the screw 16 and then turning in the screws 17, the jaw 14 may be shifted inward toward the jaw 9 or permit it to move outward away from the jaw 9 to thus control the width of the extrusion slot 15. After the jaw 14 has been adjusted properly, the screws 16 are tightened so as to hold the jaw 14 in its adjusted position against any possible movement.

The jaw 9 is provided with transversely extending passages 8ᵇ similar to the passages 8ᶜ in the jaw 14 and these passages 8ᵇ and 8ᶜ are adapted to be connected to any source of heating fluid so that these jaws are kept at the requisite temperature. The structure shown in Figs. 4 and 5 is the same as that shown in Figs. 2 and 3, except that only one transversely extending cross-bar or wall 6 is used in the chamber 2 and the plunger has two depending portions or extensions 7 operating one on each side of the cross-bar or wall 6. Otherwise than this, the structure shown in Fig. 4 operates exactly the same as the structure shown in Fig. 2.

In order to extrude the heated and plastic polymerisation product directly upon the glass plates while the foil, sheet or layer being extruded retains its inherent heat and adhesiveness, it is necessary that the glass plates to be coated shall be moved transversely to the direction of movement of the mass being extruded from the press and at a distance from the under faces of the jaws 9 and 14, which is about equal to the thickness of the extruded foil or layer, so that the material, as it is extruded, comes into immediate contact with the glass plates, which plates are preferably preheated, and the extruded mass is bent at right angles to the direction of the slot 15 by the moving glass plates and is carried therewith.

For the purpose of moving the glass plates beneath the extruder, I have illustrated in Fig. 1 continuous bands 18, these bands being of fabric and passing over a series of rollers 19. Any suitable means may be used for causing the movement of the endless bands 18 so as to carry the glass plates beneath the slot 15. Heating devices 20 may be disposed between the bands for preheating the plates and above these bands 18 and forward of the chamber 2 there may be provided means designated 21, as shown diagrammatically in Fig. 1 whereby an adhesive having a high boiling point may be deposited upon the upper faces of the glass plates in the form of an extremely thin foil or film.

With the apparatus as illustrated in Fig. 1, the preheated glass plates A are carried successively beneath the extruding slot 15 while the plunger of the press is being forced downward to extrude the polymerised material in plastic form onto the sheets of glass. Attention is here called to the fact that the extruding slot 15 is of considerable depth from top to bottom and that it is defined by two heated walls, namely, the jaw 14 and the jaw 9. By this means, the layers or foils being extruded are shaped in the interior of the slot 15 so that after leaving the slot, the foil or layer does not have any tendency to expand after extrusion. It is reiterated that the distance from the upper face of the glass plates and the under faces of the jaws 9 and 14 is approximately equal to the thickness of the extruded sheet, foil or layer so that the latter, immediately after extrusion, comes into contact with the glass plates and is bent at right angles to the extrusion slot by these plates and carried therewith and that the lower end faces of the jaws 9 and 14 cooperate to force the film or layer into intimate contact with the glass plates and that this drives away the air between the layer or foil and the glass plates and prevents the occluding of bubbles of air or areas of air between the mass and the plates and, of course, where adhesive is applied to the plates prior to passing the discharge slot, the form of the lower ends of the jaws 9 and 14 will act to force the extruded film or layer into close adherent contact with said adhesive. With the apparatus illustrated in the drawings, the heated mass is extruded continuously onto a series of glass plates and the compound sheet so formed may be divided by any convenient cutting means when the plates have been carried clear of the press.

It is also to be particularly noted that the polymerised product produced by the process disclosed in my application, Ser. No. 76,044, can be rendered temporarily plastic by the application of heat and pressure. This heat, however, must be a uniform heat to about 100° C. but not above 133° C. At this temperature, the polymerisation product, which as before remarked is thixotropic, is rendered so moldable that it can be extruded under pressure from comparatively narrow slots or holes. The temperature, however, must be uniform and the material must be kept at this uniform temperature not only in the chamber 2 but while passing through the extrusion slot itself and until it is discharged onto the preheated glass plate. The glass plates are preferably preheated to a temperature of from 100° C. to 133° C.

It is, of course, to be understood that the chamber 2 is relatively narrow or short in the direction at right angles to the direction of the slot 15 but that the length of the chamber 2, and of course, the length of the plunger, is equal to the width of the glass or other plates or sheets which are to be coated with the polymerised material. There are no heating cavities or passages in the plunger or the extensions 7 of the plunger head nor are there any heating passages through the end walls of the chamber 2 but only through the long side walls of the chamber. If the short end walls of the chamber were provided with heating elements, the mass in the vicinity of these short side walls would be supplied with heat by contact and radiation from three sides. In view of the heat insulating qualities of the mass, a superheating would occur within the end portions of each chamber resulting in a detrimental discoloration of the mass. It is for this same reason that the plunger is not heated.

What is claimed is:

1. A method of producing a sheet of plastic material and applying it upon a supporting element including heating a highly polymerised mass in a chamber, extruding a layer of material of uniform thickness from the chamber while maintaining the mass and that portion of the mass which is being extruded at a softening temperature and simultaneously passing a support at right angles to the direction of extrusion and beneath the chamber and at a distance from the extrusion opening of the chamber approximately equal to the thickness desired for said layer.

2. A method of producing a sheet of plastic material and applying it upon a supporting element including heating a highly polymerised mass in a chamber having a relatively deep extrusion slot, the slot having a width equal to the desired thickness of the sheet to be extruded, heating the polymerised material within the chamber to its softening temperature and in the extrusion slot and passing a support to which the layer is to be applied at right angles to the direction of said slot and at a distance from the adjacent end of the slot approximately equal to the thickness of the layer being extruded from the slot.

3. A method of producing a sheet of plastic material and applying it upon a supporting element including disposing a highly polymerised mass of material having a softening temperature of at least 100° C. within a chamber having a relatively deep extrusion slot, the slot having a length equal to the width of the supporting element upon which the sheet is to be applied, forcing the material out of said slot under pressure while maintaining within the chamber and within the extrusion slot a temperature of from 100° C. to 133° C. and simultaneously passing the supporting element beneath the lower end of the extrusion slot and at right angles thereto and at a distance from the lower end of the slot approximately equal to the width of the slot and to the thickness of the layer desired to be placed upon the support.

4. A method of producing a sheet of plastic material and applying it upon a supporting element including disposing a highly polymerised mass of material having a softening temperature of at least 100° C. within a chamber having a relatively deep extrusion slot, the slot having a length equal to the width of the supporting element upon which the sheet is to be applied, forcing the material out of said slot under pressure while maintaining within the chamber and within the extrusion slot a temperature of from 100° C. to 133° C. and simultaneously passing a preheated supporting element beneath the lower end of the extrusion slot and at right angles thereto and at a distance from the lower end of the slot approximately equal to the width of the slot and to the thickness of the layer desired to be placed upon the support.

5. A method of producing a sheet of plastic material and applying it upon a supporting element including disposing a highly polymerised mass of material having a softening temperature of at least 100° C. within a chamber having a relatively deep extrusion slot, the slot having a length equal to the width of the supporting element upon which the sheet is to be applied, forcing the material out of said slot under pressure while maintaining within the chamber and within the extrusion slot a temperature of from 100° C. to 133° C., applying an adhesive having a high boiling point to the upper surface of the support and passing said support beneath the extrusion slot and at right angles to the length thereof and at a distance from the lower end of the slot approximately equal to the width of the slot and the desired thickness of the sheet.

6. A method of producing a sheet of plastic material and applying it upon a supporting element which includes rendering a mass of highly polymerised thixotropic material plastic by heat sufficient to render it soft, and extruding it under pressure through a slot whose walls are maintained in a heated condition and which has sufficient depth to insure that the extruded mass shall assume permanently the shape of a sheet before extrusion is completed and depositing the extruded sheet on a support moving at right angles to the length of the slot and at right angles to the direction of extrusion at a distance from the extrusion outlet approximately equal to the breadth of the slot.

ADOLF KAMPFER.